(12) United States Patent
Juelsgaard

(10) Patent No.: US 11,609,314 B2
(45) Date of Patent: Mar. 21, 2023

(54) LIDAR SYSTEM DESIGN TO MITIGATE LIDAR CROSS-TALK

(71) Applicant: UATC, LLC, San Francisco, CA (US)

(72) Inventor: Soren Juelsgaard, El Sobrante, CA (US)

(73) Assignee: UATC, LLC, Mountain View, CA (US)

( * ) Notice: Subject to any disclaimer, the term of this patent is extended or adjusted under 35 U.S.C. 154(b) by 584 days.

(21) Appl. No.: 16/520,799

(22) Filed: Jul. 24, 2019

(65) Prior Publication Data

US 2020/0041624 A1 Feb. 6, 2020

Related U.S. Application Data

(60) Provisional application No. 62/714,042, filed on Aug. 2, 2018, provisional application No. 62/714,043, filed on Aug. 2, 2018.

(51) Int. Cl.
*G01S 7/497* (2006.01)
*G01S 7/48* (2006.01)
(Continued)

(52) U.S. Cl.
CPC ........... *G01S 7/497* (2013.01); *G01S 7/4804* (2013.01); *G01S 7/4863* (2013.01);
(Continued)

(58) Field of Classification Search
CPC ...... G01S 7/497; G01S 7/4804; G01S 7/4863; G01S 7/4865; G01S 7/495; G01S 17/931; G01S 17/89; G01S 17/87; G01S 17/14
See application file for complete search history.

(56) References Cited

U.S. PATENT DOCUMENTS

| | | | | |
|---|---|---|---|---|
| 5,243,181 A | * | 9/1993 | Bondarev | G01S 7/497 250/221 |
| 5,699,151 A | * | 12/1997 | Akasu | G01S 7/497 356/5.01 |

(Continued)

FOREIGN PATENT DOCUMENTS

| | | | | | |
|---|---|---|---|---|---|
| GB | 2275146 A | * | 8/1994 | | G01S 17/14 |
| GB | 2290918 A | * | 1/1996 | | G01S 7/495 |

(Continued)

OTHER PUBLICATIONS

Entries for the word, "PRECISION" from THEFREEDICTIONARY.COM. Retrieved on Nov. 7, 2022. (Year: 2022).*

(Continued)

*Primary Examiner* — Bernarr E Gregory
(74) *Attorney, Agent, or Firm* — Dority & Manning, P.A.

(57) ABSTRACT

Aspects of the present disclosure involve systems, methods, and devices for mitigating Lidar cross-talk. Consistent with some embodiments, a Lidar system is configured to include one or more noise source detectors that detect noise signals that may produce noise in return signals received at the Lidar system. A noise source detector comprises a light sensor to receive a noise signal produced by a noise source and a timing circuit to provide a timing signal indicative of a direction of the noise source relative to an autonomous vehicle on which the Lidar system is mounted. A noise source may be an external Lidar system or a surface in the surrounding environment that is reflecting light signals such as those emitted by an external Lidar system.

20 Claims, 8 Drawing Sheets

(51) Int. Cl.
*G01S 7/4863* (2020.01)
*G01S 7/4865* (2020.01)
*G01S 7/495* (2006.01)
*G01S 17/931* (2020.01)
*G01S 17/00* (2020.01)

(52) U.S. Cl.
CPC ............ *G01S 7/4865* (2013.01); *G01S 7/495* (2013.01); *G01S 17/931* (2020.01)

(56) References Cited

U.S. PATENT DOCUMENTS

2018/0067492 A1* 3/2018 Oder .................... G01S 17/931
2018/0188359 A1  7/2018 Droz et al.

FOREIGN PATENT DOCUMENTS

| GB | 2318240 |   | 4/1998 |   |   |
|----|---------|---|--------|---|---|
| GB | 2318242 A | * | 4/1998 | ............ | G01S 7/495 |
| WO | 2017119547 |   | 7/2017 |   |   |

OTHER PUBLICATIONS

"International Application Serial No. PCT US2019 043410, International Search Report dated Nov. 27, 2019", 5 pgs.
"International Application Serial No. PCT US2019 043410, Written Opinion dated Nov. 27, 2019", 6 pgs.

\* cited by examiner

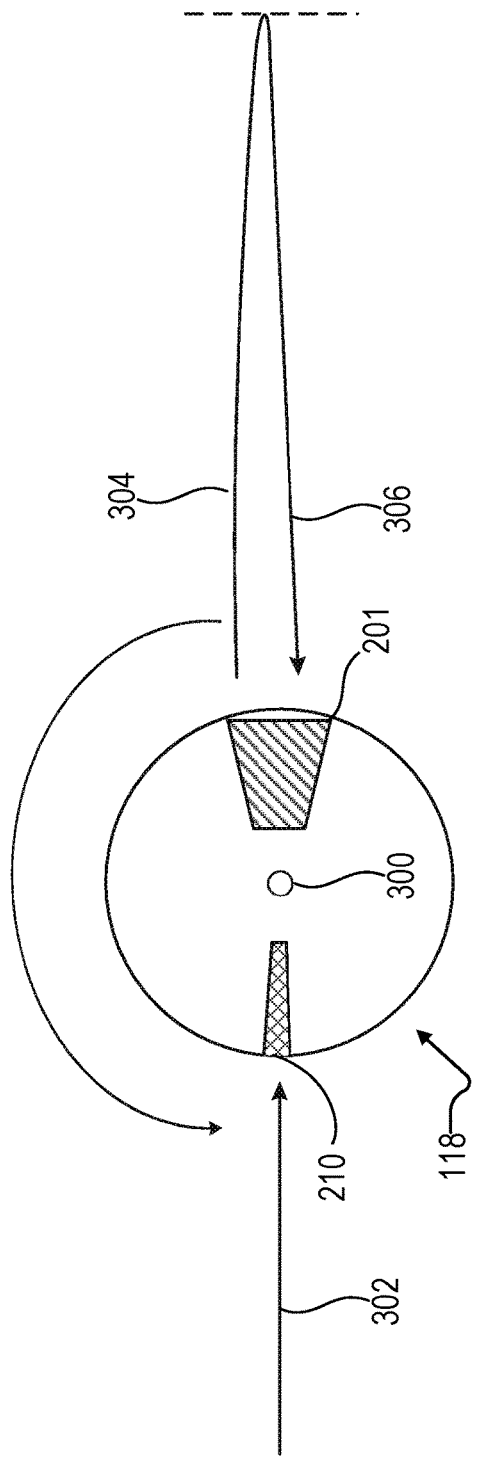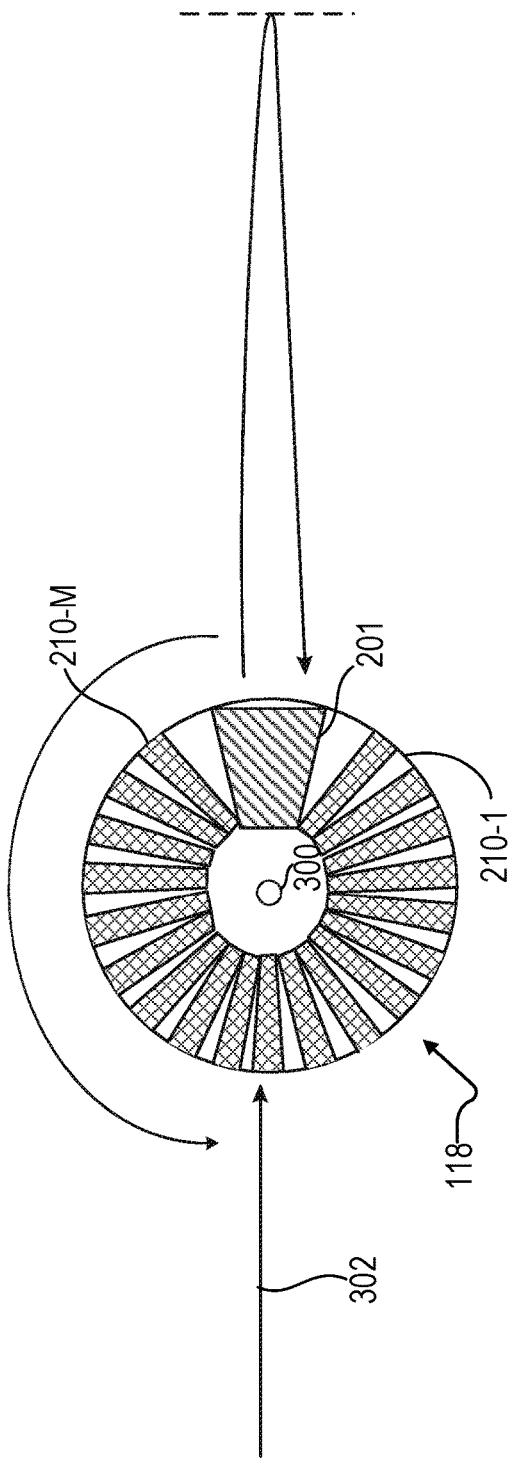

LIDAR SYSTEM DESIGN TO MITIGATE LIDAR CROSS-TALK

CLAIM FOR PRIORITY

This application claims the benefit of priority of U.S. Provisional Application No. 62/714,042, filed Aug. 2, 2018 and 62/714,043, filed Aug. 2, 2018, the benefit of priority of each of which is hereby claimed herein, and which applications are hereby incorporated herein by reference in their entireties.

TECHNICAL FIELD

The subject matter disclosed herein relates to light detection and ranging (Lidar) systems. In particular, example embodiments may relate to a Lidar system design to mitigate Lidar cross-talk.

BACKGROUND

Lidar is a radar-like system that uses lasers to create three-dimensional representations of surrounding environments. A Lidar unit includes at least one emitter paired with a receiver to form a channel, though an array of channels may be used to expand the field of view of the Lidar unit. During operation, each channel emits a light signal into the environment that is reflected off of the surrounding environment back to the receiver. A single channel provides a single point of ranging information. Collectively, channels are combined to create a point cloud that corresponds to a three-dimensional representation of the surrounding environment. The Lidar unit also includes circuitry to measure the time of flight—i.e., the elapsed time from emitting the light signal to detecting the return signal. The time of flight is used to determine the distance of the Lidar unit to the detected object.

Increasingly, Lidar is finding applications in autonomous vehicles (AVs) such as partially or fully autonomous cars. An AV that uses Lidar can have its receiver channel saturated or get significant noise in its point cloud when another AV using Lidar is within range. In environments in which there are a large number of AVs using Lidar, this type of crosstalk is extremely problematic because it is likely to cause issues with down-stream processes that use the Lidar data for vehicle perception, prediction, and motion planning.

BRIEF DESCRIPTION OF THE DRAWINGS

Various ones of the appended drawings merely illustrate example embodiments of the present inventive subject matter and cannot be considered as limiting its scope.

FIG. 3A is a diagram illustrating a Lidar system that includes a noise source detector, according to some embodiments.

FIG. 3B is a diagram illustrating a Lidar system that includes multiple noise source detectors, according to some embodiments.

DETAILED DESCRIPTION

Figure 1:
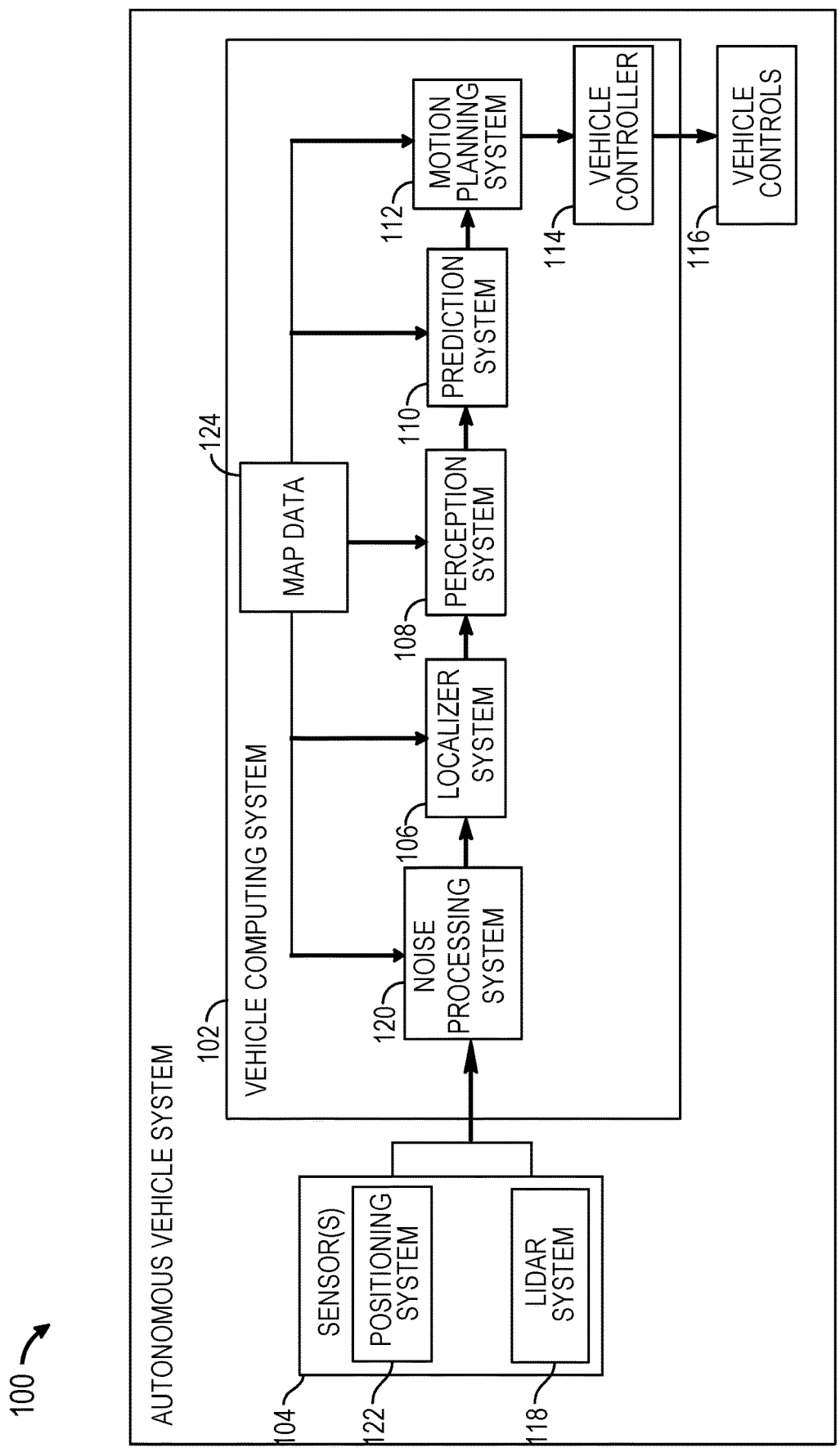
FIG. 1 is a block diagram illustrating an example autonomous vehicle (AV) system, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure address the forgoing issues with Lidar crosstalk in autonomous systems and others with systems, methods, and devices to detect, track, and mitigate effects of Lidar crosstalk caused by one or more noise sources.

In some embodiments, a Lidar system is configured to include one or more noise source detectors that detect noise signals that may produce noise in return signals received at the Lidar system. A noise source detector comprises a light sensor to receive a noise signal produced by a noise source and a timing circuit to provide a timing signal (e.g., a timestamp) indicative of a direction of the noise source relative to an autonomous vehicle on which the Lidar system is mounted. A noise source may be an external Lidar system (e.g., a Lidar system of another vehicle) or a surface in the surrounding environment that is reflecting light signals (e.g., emitted by the external Lidar system).

The light sensor is tuned to receive light signals that are the same wavelength as the light signals received by the detectors in each channel of the Lidar system in which the noise source detector is included. In some embodiments, the light sensor may also be tuned to receive light signals of other wavelengths, such as those that may be utilized by Lidar systems of other manufacturers. The light sensor may have a wider vertical field of view than a horizontal field of view so as to reduce false positive noise source detections. The light sensor also measures an intensity of received noise signals, which may be used by downstream processes to classify the noise source as an external Lidar system or negligible noise source.

The timing circuit maintains a clock signal and uses the clock signal to generate a timestamp corresponding to a time at which a noise signal is received by a corresponding light sensor. The timestamp indicates a position of the noise signal received within a spin cycle of the Lidar system and can be correlated to the direction of the noise source relative to the autonomous vehicle. For example, the Lidar system may include an array of channels that continuously rotate around a central axis of the Lidar system along with the light sensor during operation of the autonomous vehicle. The "spin cycle" of the Lidar system refers to a complete rotation of these elements around the central axis of the Lidar system. Given that the array of channels and light sensor rotate around the central axis at a fixed rate (also referred to as "spin rate"), a duration of each spin cycle is fixed. Thus, the time at which a noise signal is received by the light sensor may be correlated to a position of the light sensor within the spin cycle based on the duration of the spin cycle.

The Lidar system also includes circuitry to measure the time of flight (ToF), which is used to determine the distance of the Lidar unit to the detected object. This type of circuit generally requires a high level of precision to ensure distances of detected objects can be accurately computed. On the other hand, the timing circuitry of a noise signal detector does not require such precision, and thus, the timing circuitry of the noise signal detector can be much less complex and occupy less space than the circuitry used to measure ToF. In other words, the timing circuitry of the noise signal detector operates at a lower level of precision than the circuitry used to measure ToF.

As the array of channels rotate around the central axis, each channel emits light signals into the surrounding environment and receives return signals corresponding to reflections of the emitted lights signals off of the surrounding environment. The direction at which the array of channels emits the light signals may be referred to as a "scanning direction" of the Lidar system. In embodiments in which the Lidar system includes a single noise source detector, the noise source detector may also rotate around the central axis of the Lidar system and may be positioned at or about 180 degrees from a center of the scanning direction of the Lidar system.

In embodiments in which a Lidar system includes multiple noise source detectors, the noise source detectors may be evenly spaced around the central axis and may also be rotated around the central axis. In these embodiments, each noise source detector operates in the same manner as described above, but expanding the number of noise source detectors enables the Lidar system to detect direct illumination by an external Lidar system even if both Lidar systems are scanning in a synchronous pattern.

In some embodiments, an autonomous vehicle system for controlling a vehicle comprises a Lidar unit to provide ranging information for the vehicle, a noise source detector to detect a noise signal producing noise in one or more return signals being received at the Lidar unit, and a vehicle computing system. The noise source detector detects a noise signal produced by a noise source, and generates a timestamp comprising a time at which the noise signal is received. The noise source detector communicates noise data to the vehicle computing system. The noise data comprises a measured intensity of the noise signal corresponding to the noise source and a time signal (e.g., timestamp) indicative of the direction of the noise source relative to the AV system.

The vehicle computing system is configured to detect a noise source by processing the noise data provided by the noise source detector. The detecting of the noise source includes determining a direction of the noise source relative to the vehicle. The vehicle computing system determines the direction of the noise source based on the timestamp generated by the noise source detector that corresponds to the time at which the noise signal is received. In particular, the vehicle computing system determines the direction of the noise source relative to the AV system by correlating the timestamp to a position of the noise source detector in a spin cycle of the Lidar unit based on a spin rate of the Lidar unit (e.g., a rate at which the array of channels completes the spin cycle) and correlating the position of the noise source detector in the spin cycle to the direction of the noise source relative to the AV system based on a position of the vehicle relative to the surrounding environment and a position of the noise source detector relative to the array of channels.

The detecting of the noise source performed by the vehicle computing system also includes determining a classification of the noise source based on the intensity of the noise signal. The noise source may be classified as either an external Lidar system (e.g., a Lidar system of another vehicle or a surface in the surrounding environment that is reflecting light signals emitted by the external Lidar system) or a negligible noise source. The vehicle computing system may determine the classification of the noise source by comparing the intensity of the noise signal to a threshold. For example, the vehicle computing system may classify the noise source as an external Lidar system based on the intensity of the noise signal exceeding the threshold. Otherwise, the vehicle computing system may classify noise source as a negligible noise source.

The vehicle computing system is further configured to track the noise source as it moves within the surrounding environment. The vehicle computing system may track the source of noise by estimating an initial location of the noise source based on a direction of the noise source determined based on a first noise signal and determining a predicted location of the noise source based on the initial location. Upon receiving noise data corresponding to a second noise signal received at the noise source detector, the vehicle computing system associates the second noise signal with the noise source based on the predicted location of the noise source and updates the predicted location of the noise source based on the second noise signal. The vehicle computer system may continue to associate subsequently received noise signals with the noise source based on predicted locations, and may continue to update predicted locations of the noise source based on the subsequently received noise signals.

The vehicle computing system also generates state data to describe the noise source and controls one or more operations of the vehicle based on the state data. The state data may comprise the classification of the noise source, a direction of the noise source relative to the vehicle, current locations of the noise source, and predicted locations of the noise source.

Upon detecting a noise source, a perception system of the vehicle computing system may take preventative action to mitigate the effects of the noise. For example, as part of a sensor fusion process whereby information from multiple sensors of the autonomous vehicle system is fused together, the perception system may emphasize information received from certain sensors, mask out information from other sensors that may be less reliable due to the noise caused by the noise source, and/or change the type of filtering used in the sensor fusion.

With reference to FIG. 1, an example autonomous vehicle (AV) system 100 is illustrated, according to some embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the AV system 100 to facilitate additional functionality that is not specifically described herein.

The AV system 100 is responsible for controlling a vehicle. The AV system 100 is capable of sensing its environment and navigating without human input. The AV system 100 can include a ground-based autonomous vehicle (e.g., car, truck, bus, etc.), an air-based autonomous vehicle (e.g., airplane, drone, helicopter, or other aircraft), or other types of vehicles (e.g., watercraft).

The AV system 100 includes a vehicle computing system 102, one or more sensors 104, and one or more vehicle controls 116. The vehicle computing system 102 can assist in controlling the AV system 100. In particular, the vehicle computing system 102 can receive sensor data from the one or more sensors 104, attempt to comprehend the surrounding environment by performing various processing techniques on data collected by the sensors 104, and generate an appropriate motion path through such surrounding environment. The vehicle computing system 102 can control the one or more vehicle controls 116 to operate the AV system 100 according to the motion path.

As illustrated in FIG. 1, the vehicle computing system 102 can include one or more computing devices that assist in controlling the AV system 100. Vehicle computing system 102 can include a localizer system 106, a perception system 108, a prediction system 110, a motion planning system 112, and a noise processing system 120 that cooperate to perceive the dynamic surrounding environment of the AV system 100 and determine a trajectory describing a proposed motion path for the AV system 100. Vehicle computing system 102 can additionally include a vehicle controller 114 configured to control the one or more vehicle controls 116 (e.g., actuators that control gas flow (propulsion), steering, braking, etc.) to execute the motion of the AV system 100 to follow the trajectory.

In particular, in some implementations, any one of the localizer system 106, the perception system 108, the prediction system 110, the motion planning system 112, or the noise processing system 120 can receive sensor data from the one or more sensors 104 that are coupled to or otherwise included within the AV system 100. As examples, the one or more sensors 104 can include a Lidar system 118, a Radio Detection and Ranging (RADAR) system, one or more cameras (e.g., visible spectrum cameras, infrared cameras, etc.), and/or other sensors. The sensor data can include information that describes the location of objects within the surrounding environment of the AV system 100.

As one example, for Lidar system 118, the sensor data can include point data that includes the location (e.g., in three-dimensional space relative to the Lidar system 118) of a number of points that correspond to objects that have reflected an emitted light. For example, Lidar system 118 can measure distances by measuring the ToF that it takes a short light pulse to travel from the sensor(s) 104 to an object and back, calculating the distance from the known speed of light. The point data further includes an intensity value for each point that can provide information about the reflectiveness of the objects that have reflected an emitted light.

Additionally, the sensor data for the Lidar system 118 also includes noise data generated by one or more noise source detectors of the Lidar system 118. A noise source detector includes a sensor and circuitry to detect noises sources that may produce noise in the point data output by the Lidar system 118. A noise source may, for example, be a Lidar system of another AV or a surface reflecting signals emitted by an external Lidar system of another AV. Noise data generated by a noise source detector may include an indication of a direction of a noise source relative to the AV system 100 along with an intensity of one or more noise signals produced by the noise source. The indication may comprise a timestamp corresponding to a time at which a noise signal produced by the noise source is received at the noise source detector. As will be discussed in further detail below, the timestamp may be correlated with the direction of the noise source relative to the AV system 100.

As another example, for RADAR systems, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for cameras, various processing techniques (e.g., range imaging techniques such as, for example, structure from motion, structured light, stereo triangulation, and/or other techniques) can be performed to identify the location (e.g., in three-dimensional space relative to a camera) of a number of points that correspond to objects that are depicted in imagery captured by the camera. Other sensor systems can identify the location of points that correspond to objects as well.

As another example, the one or more sensors 104 can include a positioning system 122. The positioning system 122 can determine a current position of the AV system 100. The positioning system 122 can be any device or circuitry for analyzing the position of the AV system 100. For example, the positioning system 122 can determine position by using one or more of inertial sensors; a satellite positioning system, based on Internet Protocol (IP) address, by using triangulation and/or proximity to network access points or other network components (e.g., cellular towers, WiFi access points, etc.); and/or other suitable techniques. The position of the AV system 100 can be used by various systems of the vehicle computing system 102.

Thus, the one or more sensors 104 can be used to collect sensor data that includes information that describes the location (e.g., in three-dimensional space relative to the AV system 100) of points that correspond to objects within the surrounding environment of the AV system 100.

In addition to the sensor data, the perception system 108, prediction system 110, motion planning system 112, and/or the noise processing system 120 can retrieve or otherwise obtain map data 124 that provides detailed information about the surrounding environment of the AV system 100. The map data 124 can provide information regarding: the identity and location of different travelways (e.g., roadways, alleyways, trails, and other paths designated for travel), road segments, buildings, or other items or objects (e.g., lampposts, crosswalks, curbing, etc.); known reflectiveness (e.g., radiance) of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

In addition, according to an aspect of the present disclosure, the map data 124 can include information that describes a significant number of nominal pathways through the world. As an example, in some instances, nominal pathways can generally correspond to common patterns of vehicle travel along one or more lanes (e.g., lanes on a roadway or other travelway). For example, a nominal pathway through a lane can generally correspond to a center line of such lane.

The noise processing system 120 receives some or all of the sensor data from sensors 104 and processes the sensor data to detect and track sources of noise. More specifically, the noise processing system 120 receives noise data from the Lidar system 118 and processes the noise data to detect and track noise sources. Accordingly, the noise processing system 120 may use the noise data to determine a direction of a noise source relative to the AV system 100. In particular, the Lidar system 118 may determine a direction of the noise source based on a correlation between a timestamp in the noise data and a position of a corresponding noise source detector as it rotates around a central axis of the Lidar system 118.

The noise processing system 120 also uses the noise data to classify noise sources (e.g., as either an external Lidar system or a negligible noise source). The noise processing system 120 may classify a noise source based on an intensity of a noise signal received at a noise source detector. More specifically, the noise processing system 120 may classify the noise source by comparing the intensity of the noise signal produced by the noise source with a threshold intensity.

The noise processing system 120 may track a noise source as it moves throughout a surrounding environment continuing to produce noise signals that are received by a noise source detector of the Lidar system 118. For example, the noise processing system 120 may associate a subsequently received noise signal with a detected noise source by correlating a source direction of the subsequently received noise signals with a predicted location of the detected noise source. The predicted location of the detected noise source may be determined based on an initial direction of the noise source determined based on an initial noise signal produced by the noise source.

The localizer system 106 receives the map data 124 and some or all of the sensor data from sensors 104 and generates vehicle poses for the AV system 100. A vehicle pose describes the position and attitude of the vehicle. The position of the AV system 100 is a point in a three-dimensional space. In some examples, the position is described by values for a set of Cartesian coordinates, although any other suitable coordinate system may be used. The attitude of the AV system 100 generally describes the way in which the AV system 100 is oriented at its position. In some examples, attitude is described by a yaw about the vertical axis, a pitch about a first horizontal axis, and a roll about a second horizontal axis. In some examples, the localizer system 106 generates vehicle poses periodically (e.g., every second, every half second, etc.). The localizer system 106 appends time stamps to vehicle poses, where the time stamp for a pose indicates the point in time that is described by the pose. The localizer system 106 generates vehicle poses by comparing sensor data (e.g., remote sensor data) to map data 124 describing the surrounding environment of the AV system 100.

In some examples, the localizer system 106 includes one or more localizers and a pose filter. Localizers generate pose estimates by comparing remote sensor data (e.g., Lidar, RADAR, etc.) to map data 124. The pose filter receives pose estimates from the one or more localizers as well as other sensor data such as, for example, motion sensor data from an IMU, encoder, odometer, and the like. In some examples, the pose filter executes a Kalman filter or other machine learning algorithm to combine pose estimates from the one or more localizers with motion sensor data to generate vehicle poses.

The perception system 108 can identify one or more objects that are proximate to the AV system 100 based on sensor data received from the one or more sensors 104 and/or the map data 124. In particular, in some implementations, the perception system 108 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; specular or diffuse reflectivity characteristics; and/or other state information.

In some implementations, the perception system 108 can determine state data for each object over a number of iterations. In particular, the perception system 108 can update the state data for each object at each iteration. Thus, the perception system 108 can detect and track objects (e.g., vehicles) that are proximate to the AV system 100 over time.

The prediction system 110 can receive the state data from the perception system 108 and predict one or more future locations for each object based on such state data. For example, the prediction system 110 can predict where each object will be located within the next 5 seconds, 10 seconds, 20 seconds, and so forth. As one example, an object can be predicted to adhere to its current trajectory according to its current speed. As another example, other, more sophisticated prediction techniques or modeling can be used.

The motion planning system 112 can determine a motion plan for the AV system 100 based at least in part on the predicted one or more future locations for the object provided by the prediction system 110 and/or the state data for the object provided by the perception system 108. Stated differently, given information about the current locations of objects and/or predicted future locations of proximate objects, the motion planning system 112 can determine a motion plan for the AV system 100 that best navigates the AV system 100 relative to the objects at such locations.

The motion plan can be provided from the motion planning system 112 to a vehicle controller 114. In some implementations, the vehicle controller 114 can be a linear controller that may not have the same level of information about the environment and obstacles around the desired path of movement as is available in other computing system components (e.g., the perception system 108, prediction system 110, motion planning system 112, etc.). Nonetheless, the vehicle controller 114 can function to keep the AV system 100 reasonably close to the motion plan.

More particularly, the vehicle controller 114 can be configured to control motion of the AV system 100 to follow the motion plan. The vehicle controller 114 can control one or more of propulsion and braking of the AV system 100 to follow the motion plan. The vehicle controller 114 can also control steering of the AV system 100 to follow the motion plan. In some implementations, the vehicle controller 114 can be configured to generate one or more vehicle actuator commands and to further control one or more vehicle actuators provided within vehicle controls 116 in accordance with the vehicle actuator command(s). Vehicle actuators within vehicle controls 116 can include, for example, a steering actuator, a braking actuator, and/or a propulsion actuator.

Each of the localizer system 106, the perception system 108, the prediction system 110, the motion planning system 112, the noise processing system 120, and the vehicle controller 114 can include computer logic utilized to provide desired functionality. In some implementations, each of the localizer system 106, the perception system 108, the prediction system 110, the motion planning system 112, the noise processing system 120, and the vehicle controller 114 can be implemented in hardware, firmware, and/or software controlling a general-purpose processor. For example, in some implementations, each of the localizer system 106, the perception system 108, the prediction system 110, the motion planning system 112, the noise processing system 120 and the vehicle controller 114 includes program files stored on a storage device, loaded into a memory and executed by one or more processors. In other implementations, each of the localizer system 106, the perception system 108, the prediction system 110, the motion planning system 112, the noise processing system 120, and the vehicle controller 114 includes one or more sets of computer-executable instructions that are stored in a tangible computer-readable storage medium such as RAM, hard disk, or optical or magnetic media.

Figure 2:
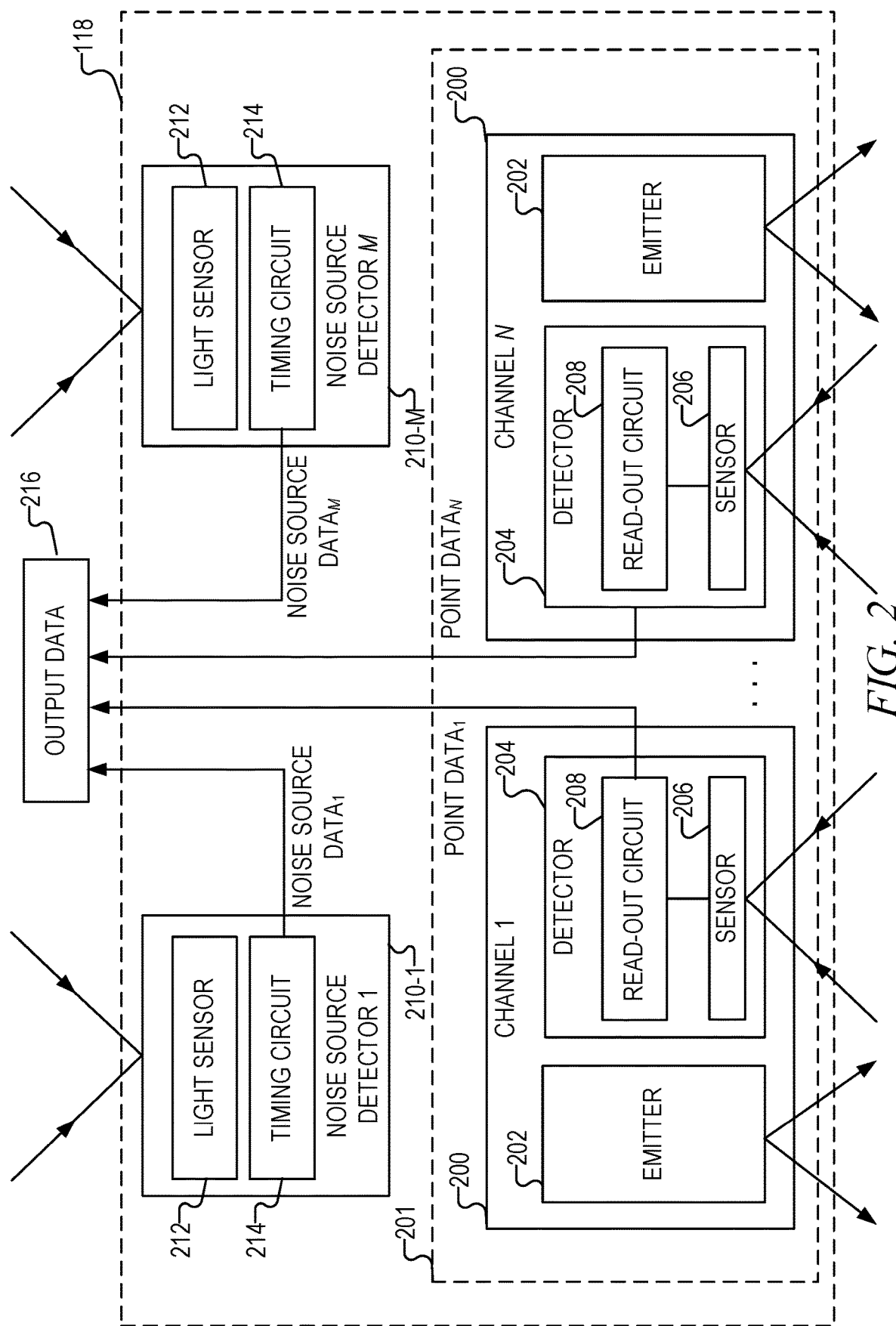
FIG. 2 is block diagram illustrating a Lidar system, which may be included as part of the AV system illustrated in FIG. 1, according to some embodiments.
Figure 4:
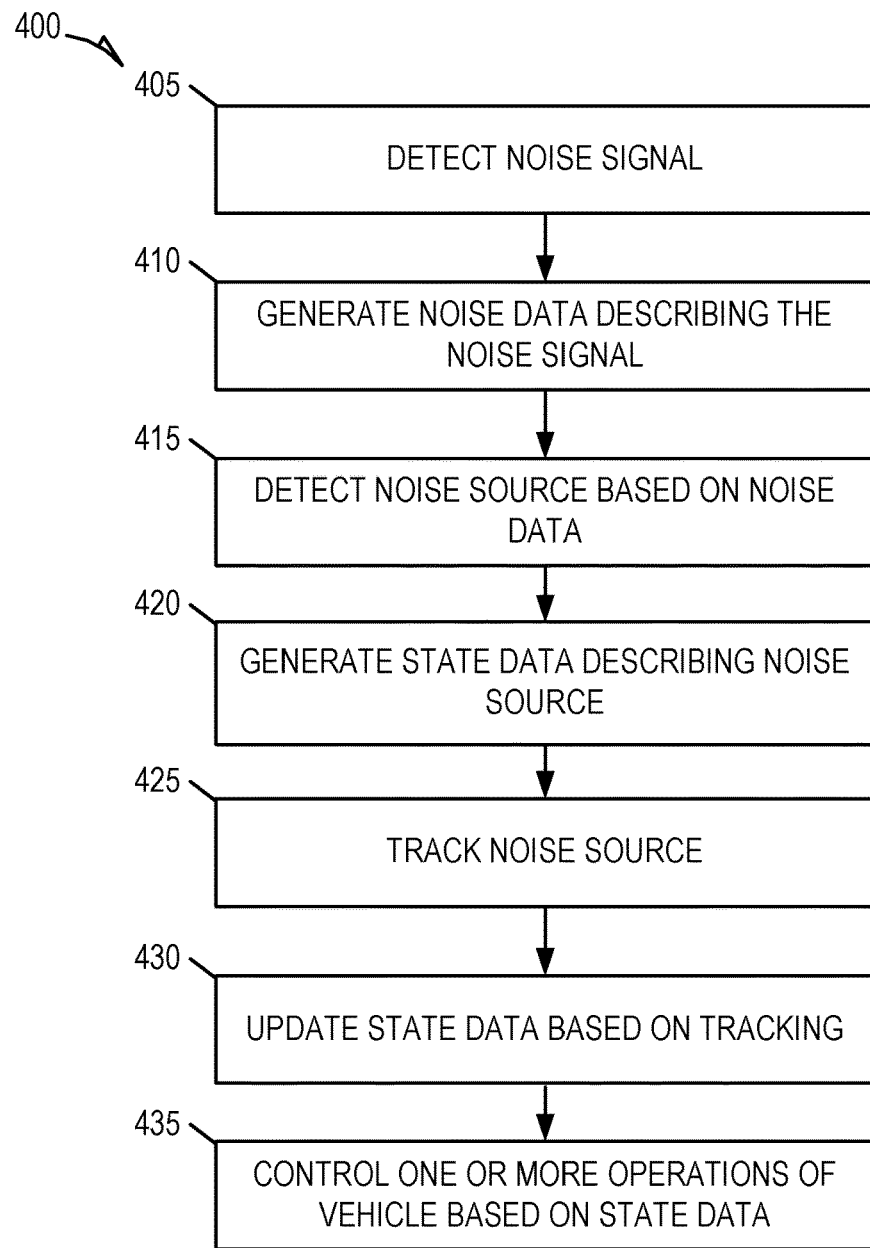
FIGS. 4-7 are flowcharts illustrating example operations of the AV system in performing a method for detecting and tracking a noise source, according to some embodiments.

FIG. 2 is block diagram illustrating the Lidar system 118, which may be included as part of the AV system 100, according to some embodiments. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the Lidar system 118 to facilitate additional functionality that is not specifically described herein.

As shown, the Lidar system 118 comprises channels 200-0 to 200-N. The channels 200-0 to 200-N collectively form an array of channels 201. Individually, each of the channels 200-0 to 200-N outputs point data that provides a single point of ranging information. Collectively, the point data output by each of the channels 200-0 to 200-N (i.e., point data$_{1-N}$) is combined to create a point cloud that corresponds to a three-dimensional representation of the surrounding environment.

Each the channels 200-0 to 200-N comprises an emitter 202 paired with a detector 204. The emitter 202 emits a light signal (e.g., a laser signal) into the environment that is reflected off the surrounding environment and returned back to a sensor 206 (e.g., an optical detector) in the detector 204. The signal that is reflected back to the sensor 206 is referred to as a "return signal." The sensor 206 provides the return signal to a read-out circuit 208 and the read-out circuit 208, in turn, outputs the point data based on the return signal. The point data comprises a distance of the Lidar system 118 from a detected surface (e.g., a road) that is determined by the read-out circuit 208 by measuring the ToF, which is the elapsed time between the emitter 202 emitting the light signal and the detector 204 detecting the return signal. To this end, the read-out circuit 208 includes timing circuitry to precisely and accurately measure the ToF.

During operation of the Lidar system 118, the array of channels 201 rotates around a central axis of the Lidar system 118. As the array of channels 201 rotates around the central axis, each of the channels 200-0 to 200-N emits light signals into the surrounding environment and receives return signals. The direction at which the array of channels 201 emits the light signals may be referred to as a "scanning direction" of the Lidar system 118.

As shown, the Lidar system 118 also comprises noise source detectors 210-1 to 210-M. Each of the noise source detectors 210-1 to 210-M are capable of detecting a noise source that may be producing noise in the point data output by the array of channels 201. Each of the noise source detectors 210-1 to 210-M comprises a light sensor 212 and a timing circuit 214. As with the array of channels 201, the noise source detectors 210-1 to 210-M rotate around a central axis of the Lidar system 118. A complete rotation of the array of channels 201 and the noise source detectors 210-1 to 210-M around the central axis of the Lidar system 118 may be referred to as a "spin cycle." The array of channels 201 and the noise source detectors 210-1 to 210-M may rotate around the central axis at a fixed rate, which is referred to as a "spin rate."

A light sensor 212 comprises a light sensor (e.g., an optical detector) that is tuned to receive light signals that are the same wavelengths as the light signals received by the sensors 206 of each of the channels 200-0 to 200-N. For example, the light sensor 212 may be configured to utilize the same frequency band filtering techniques employed in the sensor 206 of each of the channels 200-0 to 200-N. In some embodiments, the light sensor 212 may also be tuned to receive light signals of other wavelengths, such as those that may be utilized by Lidar systems of other manufacturers. The light sensor 212 may be configured to have a wider vertical field of view than a horizontal field of view so as to reduce false positive noise source detections such as those that might be caused by reflections of light signals emitted by an emitter 202 of the array of channels 201. The light sensor 212 also measures an intensity (e.g., an amplitude) of received noise signals, which may be used by the noise processing system 120 to classify the noise source as either an external Lidar system or a negligible noise source.

The timing circuit 214 maintains a clock signal and uses the clock signal to generate a timestamp corresponding to a time at which a noise signal is received by a corresponding light sensor 212. The timestamp indicates a position of the noise signal received within a spin cycle of the Lidar system 118 and is correlated with a direction of the noise source relative to the autonomous vehicle. For example, given that the array of channels 201 and noise source detectors 210-1 to 210-M rotate around the central axis at a fixed spin rate, a duration of each spin cycle is fixed. Thus, the time at which a noise signal is received by the light sensor 212 may be correlated to a position of the light sensor 212 within the Lidar system 118 when it received the noise signal based on the duration of the spin cycle.

As noted above, the detector 204 of each of the channels 200-0 to 200-N includes circuitry to measure a ToF of signals to determine the distance of the Lidar system 118 to the detected object. This type of circuit generally requires a high level of precision to ensure distances of detected objects can be accurately computed. On the other hand, the timing circuit 214 of a noise source detector 210 does not require such precision, and thus, the timing circuit 214 of the noise source detector can be much less complex and occupy less space than the circuitry used to measure ToF. In other words, the timing circuit 214 of the noise source detector 210 operates at a lower level of precision than the circuitry used to measure ToF.

Each of the noise source detectors 210-1 to 210-M output noise data comprising timestamps and noise signal intensity measurements. The noise data output by the noise source detectors 210-1 to 210-M may be combined with the point data output by the array of channels 201 to generate output data 216. The Lidar system 118 outputs the output data 216 to the vehicle computing system 102 for down-stream processing.

It shall be noted that although FIG. 2 illustrates the Lidar system 118 as having multiple instances of the noise source detector 210, in some embodiments, the Lidar system 118 may include only a single instance of the noise source detector 210. For example, FIG. 3A illustrates an example embodiment of the Lidar system 118 in which only a single instance of the noise source detector 210 is included. As shown, the noise source detector 210 and the array of channels 201 rotate around a central axis 300 of the Lidar system 118. The noise source detector 210 is positioned at about 180 degrees from the scanning direction of the array of channels 201. For example, as illustrated, when receiving a noise signal 302, the noise source detector 210 is about 180 degrees from the array of channels 201 as it emits a light signal 304 and receives a return signal 306. As noted above, upon receiving the noise signal 302, the noise source detector 210 measures an intensity of the noise signal 302 and generates a timestamp corresponding to a time at which the noise signal 302 is received. The noise source detector 210 outputs the intensity and the timestamp to the vehicle computing system 102 as noise data. The noise processing system 120 may correlate the timestamp to a position of the noise source detector 210 in the spin cycle, which may be used to determine a direction of the noise source relative to the AV system 100.

FIG. 3B illustrates an example embodiment of the Lidar system 118 in which multiple instances of the noise source detector 210 are included. For example, as shown, the Lidar system 118 includes noise source detectors 210-1 to 210-M. The noise source detectors 210-1 to 210-M are positioned around the central axis 300 at a fixed distance from one another. Similar to the embodiment discussed above with respect to FIG. 3A, the noise source detectors 210-1 to 210-M and the array of channels 201 rotate around the central axis 300 of the Lidar system 118. Each of the noise source detectors 210-1 to 210-M is capable of detecting noise signals as they rotate around the central axis 300. As with the embodiment discussed above, upon receiving the noise signal 302, the receiving one of the noise source detectors 210-1 to 210-M measures an intensity of the noise signal and generates a timestamp corresponding to a time at which the noise signal is received. By utilizing multiple instances of the noise source detector 210, the Lidar system 118 can detect direct illumination by an external Lidar system even if both the Lidar system 118 and the external Lidar system are scanning in a synchronous pattern.

FIG. 4-7 are flowcharts illustrating example operations of the AV system 100 in performing a method 400 for detecting and tracking a noise source, according to some embodiments. The method 400 may be embodied in computer-readable instructions for execution by a hardware component (e.g., a processor) such that the operations of the method 400 may be performed by one or more components of the AV system 100. Accordingly, the method 400 is described below, by way of example with reference thereto. However, it shall be appreciated that the method 400 may be deployed on various other hardware configurations and is not intended to be limited to deployment on the vehicle computing system 102.

At operation 405, a noise source detector 210 detects a noise signal. More specifically, a light sensor 212 of the noise source detector 210 receives a light signal. The light sensor 212 may receive the light signal from a direction other than the scanning direction of the Lidar system 118.

At operation 410, the noise source detector 210 generates noise data to describe the noise signal. The noise data comprises a time signal (e.g., a timestamp) that is indicative of a direction of a noise source corresponding to the noise signal and a measured intensity of the noise signal. Further details regarding the generating of the noise data are discussed below in reference to FIG. 5.

At operation 415, the noise processing system 120 detects a noise source corresponding to the noise signal based on the noise data. As will be discussed in further detail below, the detecting of the noise source comprises determining the direction of the noise source relative to the AV system 100 and determining a classification of the noise source (e.g., an external Lidar system or a negligible noise source).

At operation 420, the perception system 108 generates state data to describe the noise source. The state data includes the direction of the noise source relative to the AV system 100 and the classification of the noise source. The state data may further include a current location of the noise source and/or one or more predicted locations of the noise source determined by the prediction system 110.

At operation 425, the noise processing system 120 works in conjunction with the perception system 108 and prediction system 110 to track the noise source as it moves through the surrounding environment. These systems may work together to track the noise source based on one or more subsequent noise signals received by a noise source detector 210 of the Lidar system 118. In tracking the noise source, one of several known tracking techniques may be employed. For example, as will be discussed further below, noise processing system 120 may track the noise source by estimating an initial location of the noise source based on the direction of the noise source (determined as part of operation 415) and determining a predicted location of the noise source based on the initial location. Upon receiving noise data corresponding to a subsequent noise signal received at the noise source detector 210, the noise processing system 120 associates the subsequent noise signal with the noise source based on the predicted location of the noise source and the noise processing system 120 updates the predicted location of the noise source based on the subsequent noise signal. The noise processing system 120 may continue to associate subsequently received noise signals with the noise source based on predicted locations, and may continue to update predicted locations of the noise source based on the subsequently received noise signals.

At operation 430, the perception system 108 updates the state data that describes the noise source based on the tracking. The updating of the state data may include updating a current or predicted location of the noise source.

At operation 435, the vehicle controller 114 controls one or more operations of the AV system 100 based on the state data that describes the noise source. For example, as discussed above, the motion planning system 112 determines a motion plan for the AV system 100 based on state data, and the vehicle controller 114 controls the motion of the AV system 100 based on the motion plan.

Figure 5:
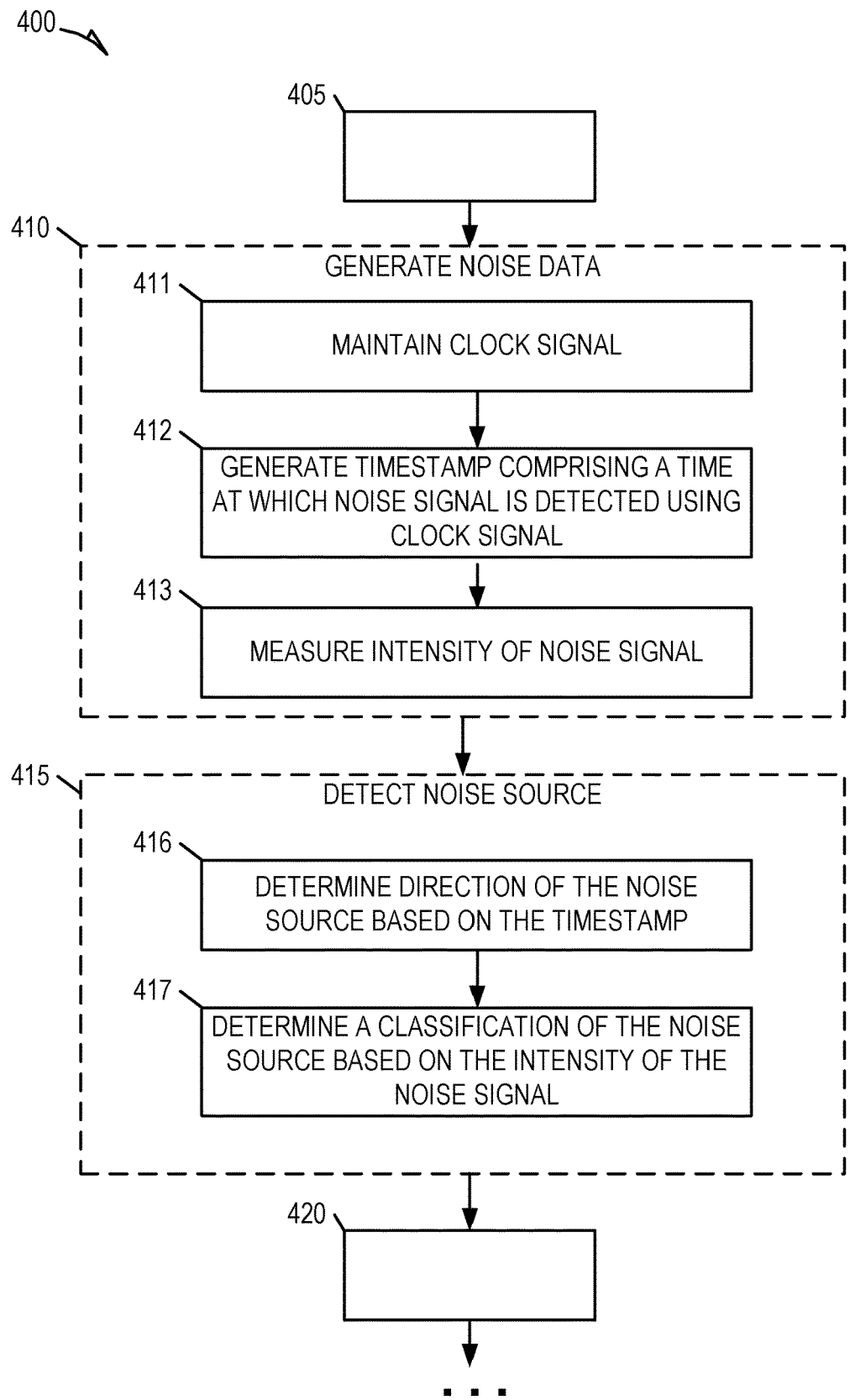

As shown in FIG. 5, the method 400 may, in some embodiments, include operations 411, 412, 413, 416, and 417. Consistent with these embodiments, the operations 411, 412, and 413 may be performed as part of operation 410 at which the noise source detector 210 generates noise data.

At operation 411, the timing circuit 214 maintains a clock signal. The clock signal may be synchronized or otherwise correlated with the spin rate of the Lidar system 118. As an example, the timing circuit 214 may initialize the clock signal at onset of operation of the Lidar system 118 when the array of channels 201 and the noise source detectors 210-1 to 210-M begin spinning around the central axis 300 of the Lidar system 118. As another example, the clock signal may comprise a repeating time signal that corresponds to a duration of a single spin cycle.

At operation 412, the timing circuit 214 uses the clock signal to generate a timestamp corresponding to a time at which the noise signal is received at the light sensor 212. Given the relationship of the clock signal and the spin rate of the Lidar system 118, each timestamp produced by the timing circuit 214 corresponds to a position within the spin cycle. Thus, the time at which the noise signal is received at the light sensor 212 may be correlated with the position of the light sensor 212 within a spin cycle of the Lidar system 118 when the light sensor 212 received the noise signal based on the relationship of the clock signal to the spin rate.

At operation 413, the light sensor 212 measures an intensity of the noise signal. For example, the light sensor 212 may measure an amplitude of the noise signal.

Consistent with these embodiments, the operations 416 and 417 may be performed as part of the operation 415, where the noise processing system 120 detects the noise source. At operation 416, the noise processing system 120 determines a direction of the noise source relative to the AV system 100 based on the time stamp. The noise processing system 120 may determine the direction of the noise source relative to the AV system 100 based on the position of the light sensor 212 within the spin cycle of the Lidar system 118 when the light sensor 212 received the noise signal, which may be determined from the timestamp. Further details regarding the determination of the direction of the noise source relative to the AV system are discussed below in reference to FIG. 6.

At operation 417, the noise processing system 120 determines a classification of the noise source (e.g., as an external Lidar system or a negligible noise source) based on the intensity of the noise signal. The noise processing system 120 may determine the classification of the noise source based on a comparison of the intensity of the noise signal to a threshold intensity. Further details regarding the determination of the classification of the noise source are discussed below in reference to FIG. 6.

Figure 6:
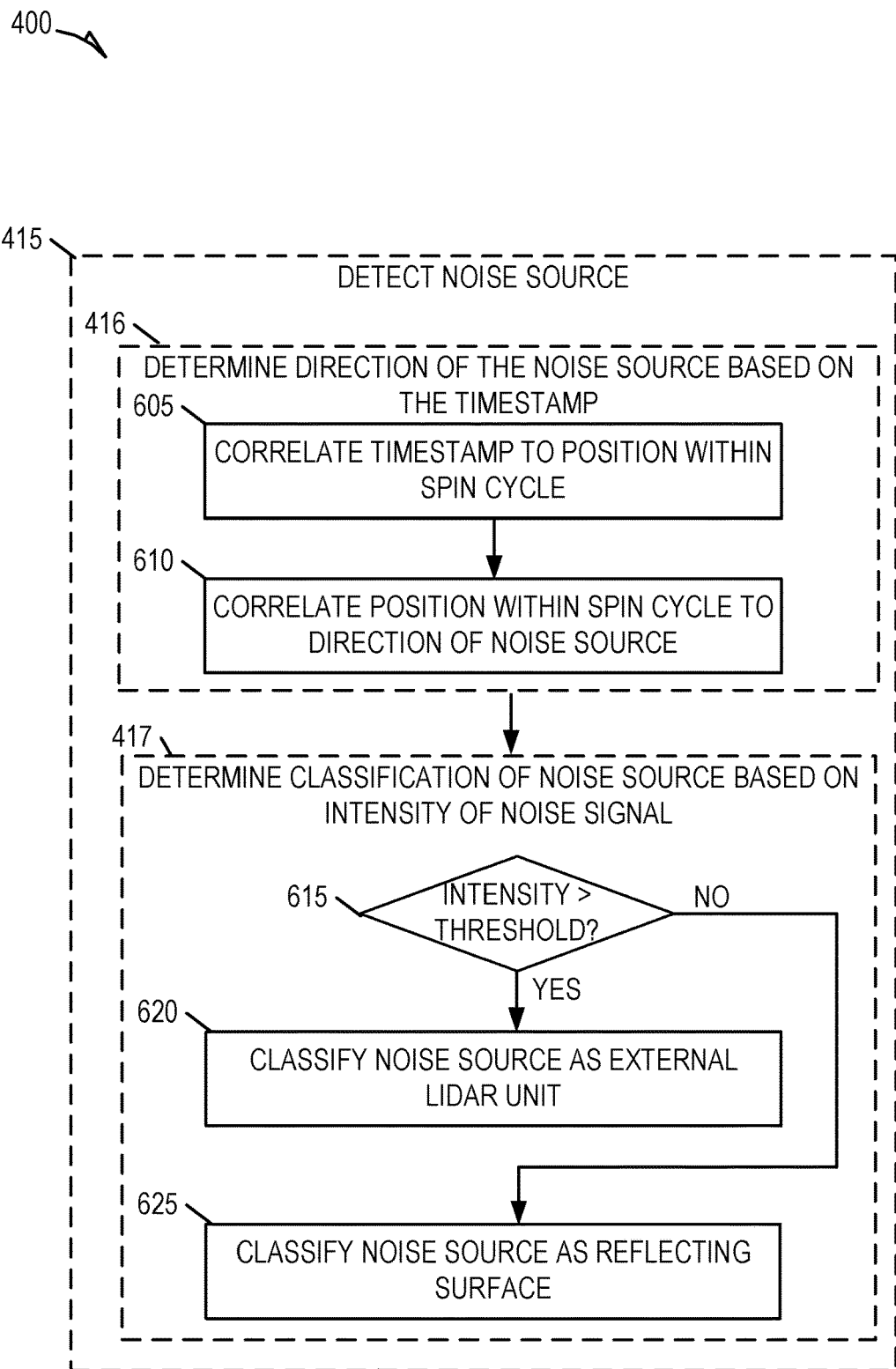

As shown in FIG. 6, the method 400 may, in some embodiments, include operations 605, 610, 615, 620, and 625. Consistent with these embodiments, the operations 605 and 610 may be performed as part of the operation 416 where the noise processing system 120 determines the direction of the noise source relative to the AV system 100.

At operation 605, the noise processing system 120 correlates the timestamp to a position of the light sensor 212 within the spin cycle of the Lidar system 118. More specifically, the noise processing system 120 correlates the timestamp to the position of the light sensor 212 within the spin cycle of the Lidar system 118 when the light sensor 212 received the noise signal. The noise processing system 120 may use the known spin rate of the Lidar system 118 to calculate a duration of the spin cycle of the Lidar system 118, and use the duration of the spin cycle to determine a fraction of a rotation completed by the light sensor 212 at the time the noise signal was received. The noise processing system 120 may use the fraction of the rotation completed by light sensor 212 at the time the noise signal was received to determine the position of the light sensor 212 within the spin cycle based on a starting position of the light sensor 212 within the spin cycle.

For example, assuming a spin rate of 1 Hz (e.g., 1 complete cycle per second) and a timestamp value of 0.5 seconds, the noise processing system 120 may determine the duration of the spin cycle is 1 second and thus, the light sensor 212 had completed half a rotation around the central axis of the Lidar system 118 when the noise signal was received. The noise processing system 120 may determine that the light sensor 212 was 180 degrees (i.e., a half rotation) from a starting position of the light sensor 212 in the spin cycle.

At operation 610, the noise processing system 120 correlates the position of the light sensor 212 within the spin cycle to the direction of the noise source relative to the AV system 100. For example, the Lidar system 118 may be mounted on the AV system 100 at a particular orientation, and the noise processing system 120 may utilize the known mount orientation of the Lidar system 118 to determine the direction of the noise source relative to the AV system 100 based on the position of the light sensor 212 within the spin cycle of the Lidar system 118.

Consistent with these embodiments, the operations 615, 620, and 625 may be performed as part of the operation 417 where the noise processing system 120 determines a classification of the noise source based on the intensity of the noise signal. At operation 615, the noise processing system 120 compares the intensity of the noise signal to a threshold intensity.

If the noise processing system 120 determines the intensity of the noise source is greater than the threshold, the noise processing system 120 classifies the noise source as an external Lidar system (e.g., an external Lidar system of another AV system), at operation 620. Otherwise, the noise processing system 120 classifies the noise source as a negligible noise source, at operation 625. For example, the noise source may be a Lidar system of another AV that is too distant from the AV system 100 to be a cause for concern.

Figure 7:
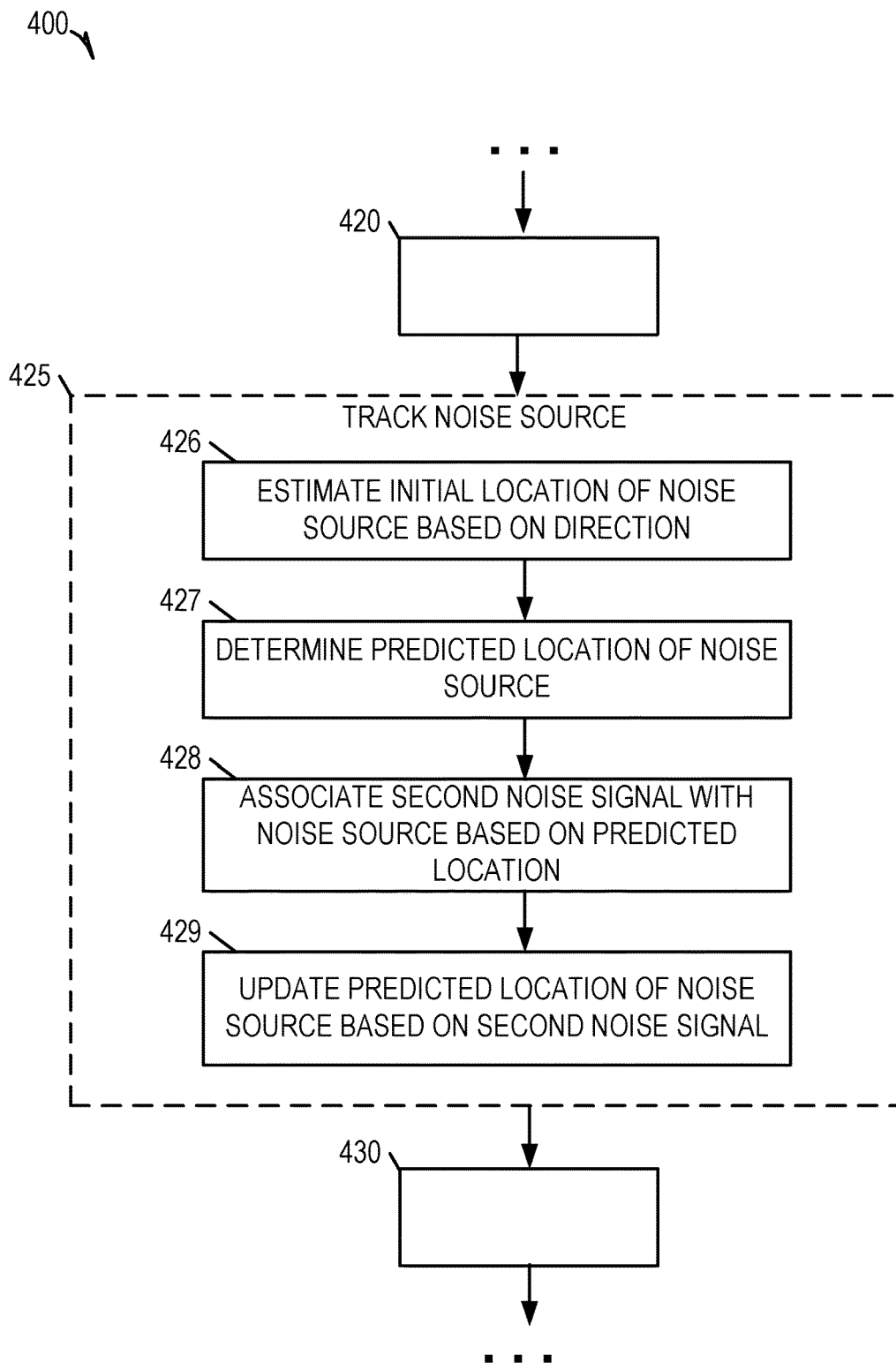

As shown in FIG. 7, the method 400 may, in some embodiments, include operations 426, 427, 428, and 429. Consistent with these embodiments, the operations 426, 427, 428, and 429 may be performed as part of the operation 425 where the noise processing system 120, the perception system 108, and prediction system 110 work in conjunction to track the source of noise as it moves through the surrounding environment.

At operation 426, the perception system 108 estimates an initial location of the noise source based on the direction of the noise source relative to the AV system 100. In estimating the location of the noise source, the perception system 108 may utilize at least part of the sensor data from sensors 104. For example, the perception system 108 may use point data from the Lidar system 118 to estimate a distance of the noise source from the AV system 100, which can be combined with the direction of the noise source relative to the AV system 100 to estimate the location of the noise source. The perception system 108 may use a Kalman filter to combine sensor measurements within the sensor data to improve accuracy of the initial location estimation.

At operation 427, the prediction system 110 determines a predicted location of the noise source based on the estimated initial location of the noise source. In determining the predicted location of the noise source, the prediction system 110 may estimate a current speed of the noise source and a current trajectory of the noise source. The prediction system 110 may determine the predicted location of the noise source using a dynamic model that assumes that the noise source will adhere to the current speed and trajectory. The prediction system 110 may estimate the current speed and current trajectory of the noise source based on one or more of: a current speed of the AV system 100; the direction of the noise source relative to the AV system 100; the distance of the noise source relative to the AV system 100; a classification of the noise source; sensor data from any one of the sensors 104; and the map data 124.

At operation 428, the noise processing system 120 associates a second noise signal with the noise source based on the predicted location of the noise. For example, upon receiving a second noise signal (subsequent to the noise signal received at operation 405, which is referred to below as the "first noise signal"), the Lidar system 118 provides noise data to the noise processing system 120 that includes a time stamp from which the noise processing system 120 may determine a direction of a source of the second noise signal relative to the AV system 100, in the same manner discussed above with respect to the first noise signal. As with the first noise signal, the perception system 108 may use the direction of the source of the second noise signal to determine a location of the source of the second noise signal. Based on the location of the source of the second noise signal being approximately the same as the predicted location of the noise source corresponding to the first noise signal, the noise processing system 120 associates the second noise signal with the noise source corresponding to the first noise signal.

At operation 429, the prediction system 110 updates a predicted location of the noise source based on the second noise signal. For example, as discussed above, the perception system 108 may combine sensor measurements (e.g., using a Kalman filter) to determine a location of the source of the second noise signal, and given that the source of the second noise signal is the noise source corresponding to the first noise signal, the location of the source of the second noise signal is the current location of the noise source. Using the current location of the noise source, the prediction system 110 may update the predicted location of the noise source using the same methodology as discussed above with respect to operation 427. The prediction system 110 may continue to update the predicted location of the noise source as subsequent noise signals are received, and the noise processing system 120 may continue to associate the subsequently received noise signals with the noise source based on the predicted locations of the noise source determined by the prediction system 110.

Figure 8:
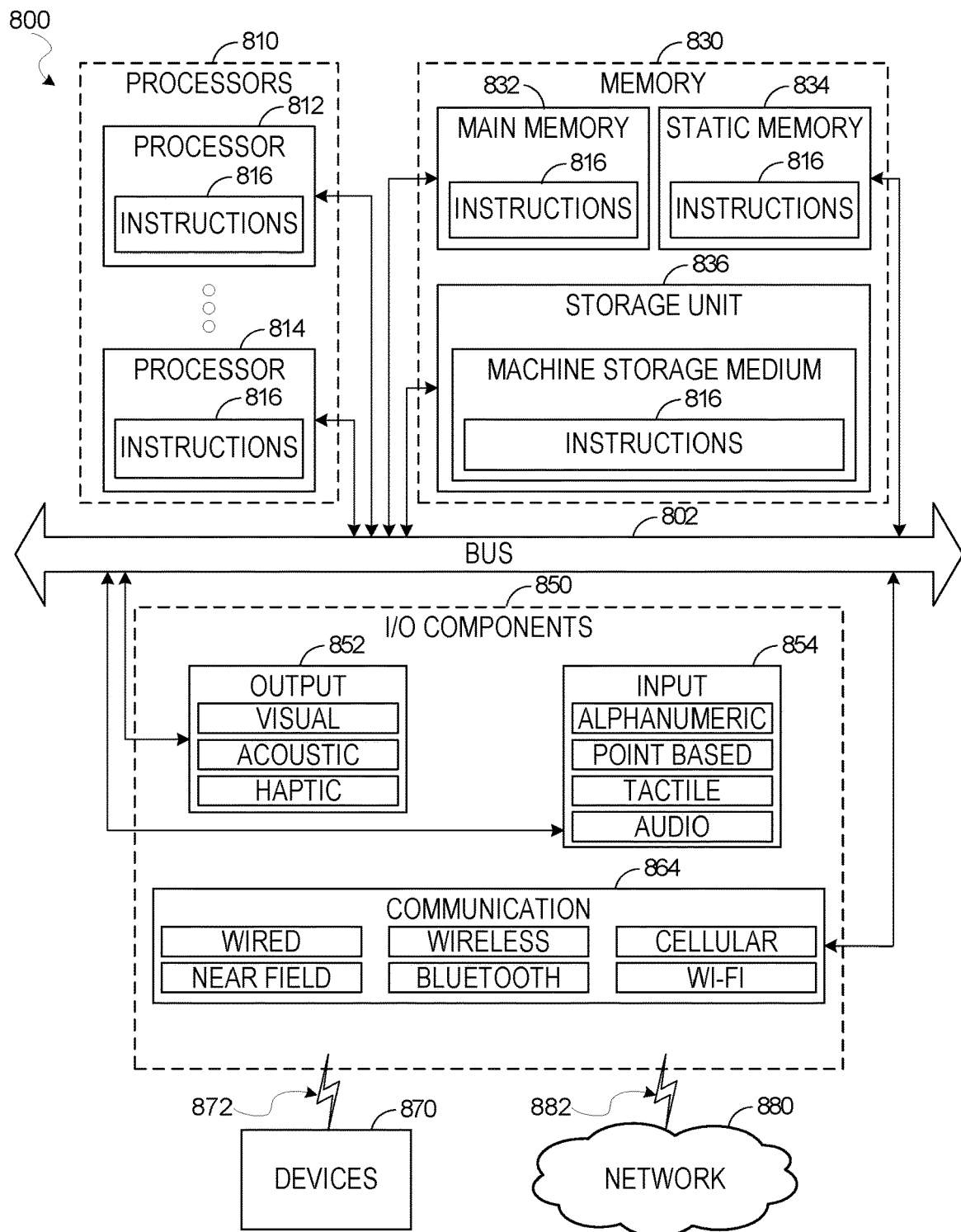
FIG. 8 is a diagrammatic representation of a machine in the example form of a computer system within which a set of instructions for causing the machine to perform any one or more of the methodologies discussed herein may be executed.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 400. In this way, the instructions 816 transform a general, non-programmed machine into a particular machine 800, such as the vehicle computing system 102, that is specially configured to carry out the described and illustrated functions in the manner described here. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, both accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). EXECUTABLE INSTRUCTIONS AND MACHINE STORAGE MEDIUM The various memories (e.g., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A Lidar system comprising:
   an array of channels to provide ranging information for an autonomous vehicle (AV), a channel of the array of channels comprising a emitter paired with a receiver, the emitter to emit light signals into a surrounding environment, the receiver to receive return signals corresponding to reflections of the light signals off the surrounding environment; and
   a noise source detector coupled to the array of channels, the noise source detector to detect a noise signal producing noise in one or more of the return signals, the noise source detector comprising:
   a light sensor to receive the noise signal; and
   a first timing circuit coupled to the light sensor, the first timing circuit to provide an indication of a direction of a noise source relative to the AV, the noise source corresponding to the noise signal,
   wherein the array of channels includes a second timing circuit to measure a time of flight of one or more of the return signals, wherein the first timing circuit operates at a first level of precision and the second timing circuit operates at a second level of precision, and wherein the first level of precision is lower than the second level of precision.

2. The Lidar system of claim 1, wherein:
   the array of channels and the light sensor continuously rotate around a central axis of the Lidar system, the indication of the direction of the noise source comprises an indication of a position of the light sensor within a spin cycle, the spin cycle corresponding to a complete rotation of the array of channels and the light sensor around the central axis.

3. The Lidar system of claim 2, wherein the indication of the position of the light sensor within the spin cycle comprises a timestamp that correlates to the position of the light sensor based on a duration of the spin cycle.

4. The Lidar system of claim 3, wherein the providing of the indication of the position of the noise source by the first timing circuit comprises:
   generating the timestamp by measuring a time at which the noise signal is received at the light sensor.

5. The Lidar system of claim 1, wherein the light sensor is positioned at about 180 degrees from a center of a scanning direction of the array of channels.

6. The Lidar system of claim 1, wherein the light sensor is tuned to a wavelength of the array of channels.

7. The Lidar system of claim 1, wherein the light sensor comprises a light sensor having a wider vertical field of view relative to a horizontal field of view.

8. The Lidar system of claim 1, wherein the light sensor measures an intensity of the noise signal produced by the noise source.

9. The Lidar system of claim 1, wherein the noise source is one of:
   an external Lidar system or a surface reflecting a light signal produced by the external Lidar system.

10. The Lidar system of claim 1, wherein the autonomous vehicle is a truck.

11. A noise source detector to detect a noise signal producing noise in one or more return signals received at a Lidar unit comprising a first timing circuit to measure a time of flight of one of more of the return signals, the noise source detector comprising:
    a light sensor to receive a noise signal; and
    a second timing circuit coupled to the light sensor, the second timing circuit to provide an indication of a direction of a noise source corresponding to the noise signal relative to an autonomous vehicle (AV) system,
    wherein the second timing circuit operates at a first level of precision and the first timing circuit operates at a second level of precision, and wherein the first level of precision is lower than the second level of precision.

12. The noise source detector of claim 11, wherein the indication of the direction of the noise source comprises an indication of a position of the light sensor within a spin cycle of the Lidar unit.

13. The noise source detector of claim 12, wherein the timing circuit provides the indication of the position of the light sensor within a spin cycle of the Lidar unit by:
    maintaining a clock signal;
    measuring, using the clock signal, a time at which the noise signal is received at the light sensor; and
    correlating the time to the position of the light sensor in the spin cycle of the Lidar unit based on a spin rate of the Lidar unit.

14. The noise source detector of claim 12, wherein the light sensor is positioned at about 180 degrees from a center of a scanning direction of the Lidar unit.

15. The noise source detector of claim 11, wherein the light sensor is tuned to a wavelength of the Lidar unit.

16. The noise source detector of claim 11, wherein the noise source is a surface in a surrounding environment.

17. A Lidar system comprising:
   an array of channels to provide ranging information for an autonomous vehicle (AV), a channel of the array of channels comprising a emitter paired with a receiver, the emitter to emit light signals into a surrounding environment, the receiver to receive return signals corresponding to reflections of the light signals off the surrounding environment; and
   a plurality of noise source detectors coupled to the array of channels, the plurality of noise source detectors to detect noise signals producing noise in one or more return signals, each noise source detector comprising:
   a light sensor to receive a noise signal; and
   a first timing circuit coupled to the light sensor, the first timing circuit to provide an indication of a direction of a noise source corresponding to the noise signal, wherein the array of channels includes a second timing circuit to measure a time of flight of one or more of the return signals, wherein the first timing circuit operates at a first level of precision and the second timing circuit operates at a second level of precision, and wherein the first level of precision is lower than the second level of precision.

18. The Lidar system of claim 17, wherein:
   the plurality of noise source detectors are positioned around a central axis of the Lidar system; and
   the array of channels and the plurality of noise source detectors are rotated around the central axis of the Lidar system.

19. The Lidar system of claim 17, wherein the providing of the indication of the direction of the noise source by the first timing circuit comprises:
   generating a timestamp by measuring a time at which the noise signal is received at the light sensor.

20. The Lidar system of claim 17, wherein the noise source is another Lidar system.

\* \* \* \* \*

UNITED STATES PATENT AND TRADEMARK OFFICE
CERTIFICATE OF CORRECTION

PATENT NO. : 11,609,314 B2
APPLICATION NO. : 16/520799
DATED : March 21, 2023
INVENTOR(S) : Soren Juelsgaard Page 1 of 1

It is certified that error appears in the above-identified patent and that said Letters Patent is hereby corrected as shown below:

In the Claims

In Column 19, Line 50, delete first occurrence of "a" and insert --an--

In Column 20, Line 41, delete the second "of" and insert --or--

In Column 21, Line 8, delete first occurrence of "a" and insert --an--

Signed and Sealed this
Second Day of May, 2023

Katherine Kelly Vidal
*Director of the United States Patent and Trademark Office*